United States Patent
Münter (10) Patent No.: US 9,511,982 B2
(45) Date of Patent: Dec. 6, 2016

(54) RAIL SYSTEM

(75) Inventor: Christoph Münter, Vlotho (DE)

(73) Assignee: Strothmann Machines & Handling GmbH, Schloss Holte-Stukenbrock (DE)

( * ) Notice: Subject to any disclaimer, the term of this patent is extended or adjusted under 35 U.S.C. 154(b) by 162 days.

(21) Appl. No.: 14/420,474

(22) PCT Filed: Aug. 28, 2012

(86) PCT No.: PCT/EP2012/066669
§ 371 (c)(1),
(2), (4) Date: Feb. 9, 2015

(87) PCT Pub. No.: WO2014/032699
PCT Pub. Date: Mar. 6, 2014

(65) Prior Publication Data
US 2015/0203332 A1 Jul. 23, 2015

(51) Int. Cl.
| B66C 11/00 | (2006.01) |
| B66C 11/06 | (2006.01) |
| E01B 25/28 | (2006.01) |
| B66C 7/08 | (2006.01) |

(52) U.S. Cl.
CPC ............... B66C 11/06 (2013.01); B66C 7/08 (2013.01); E01B 25/28 (2013.01)

(58) Field of Classification Search
CPC ............. B66C 11/06; B66C 7/08; B66C 7/00; E01B 5/08; E01B 25/28; E01B 26/00; B60B 17/00; E01C 9/01
See application file for complete search history.

(56) References Cited

U.S. PATENT DOCUMENTS

| 5,899,379 A * | 5/1999 | Bruyn ...................... E01B 21/00 238/8 |
| 6,079,630 A * | 6/2000 | Schroeder ................. E01C 9/04 238/2 |
| 2010/0282120 A1* | 11/2010 | Micheletti ............... E01B 23/02 104/106 |
| 2012/0000987 A1* | 1/2012 | Burkhardt ............... E01B 26/00 238/8 |

(Continued)

FOREIGN PATENT DOCUMENTS

| DE | 3150571 A1 | 6/1983 |
| DE | 4318383 C1 * | 7/1994 ............... B61B 1/00 |

(Continued)

*Primary Examiner* — Jason C Smith
(74) *Attorney, Agent, or Firm* — Richard M. Goldberg (57) ABSTRACT

A rail system includes carrier profiles open in the upward direction, a rail inserted in the carrier profiles with a gap therebetween, and clamping profiles which lie in the gap are in contact with an inner contact surface of the rail and partially overlap the rail, one upper part of the carrier profile expanding laterally downward to an undercut cross-sectional region, bounded by opposite upper side wall sections, inclined inwardly or curved concavely, and at least one part of the clamping profile tapers downward in wedge fashion and is bounded in the direction of the rail by the inner contact surface and in the direction of the side wall by an outer contact surface, which lies in contact with the corresponding upper side wall section, the at least one part being fitted into an appropriately shaped part of the gap within the undercut cross-sectional region of the carrier profile.

14 Claims, 6 Drawing Sheets

(56) References Cited

U.S. PATENT DOCUMENTS

| | | | | |
|---|---|---|---|---|
| 2012/0000988 A1* | 1/2012 | Burkhardt | ............... | E01B 21/00 |
| | | | | 238/9 |
| 2012/0305501 A1* | 12/2012 | Lowe | ........................ | E01C 9/04 |
| | | | | 211/13.1 |
| 2015/0203332 A1* | 7/2015 | Munter | ................... | E01B 25/28 |
| | | | | 104/106 |
| 2015/0361620 A1* | 12/2015 | Lorieux | ................. | B23K 23/00 |
| | | | | 238/163 |

FOREIGN PATENT DOCUMENTS

| | | |
|---|---|---|
| DE | 202011002642 U1 | 4/2011 |
| EP | 0607954 A2 | 7/1994 |

* cited by examiner

RAIL SYSTEM

BACKGROUND OF THE INVENTION

The present invention relates to a rail system.

Rail systems of the type present here are used in the industry for the precise movement of large machines or parts of machines, such as crane installations, drums of rotary printing machines or the like, especially however for transporting large and heavy installation parts from one manufacturing station to another. For example, for the manufacture of automobiles, so-called sliding skid systems are used, which are platforms, which run on such rail systems. Further examples are the gondolas of wind turbines, which weigh several tons, but can be moved relatively easily with the help of such assembly platforms.

Such a rail system is known, for example, from the German patent DE 4318 383 B4 of the Applicant. It comprises a carrier profile, which has a section that is open at the top and, in most cases, is embedded in the underground. A round rail, which can absorb heavy loads, is inserted in the carrier profile. The rail is fixed on both sides by clamping profiles, which are inserted into lateral spaces between the rail and the side walls of the carrier profile and partially overlap the rail. A free angular region, on which the castors of a vehicle can roll, remains on the upper side of the rail.

A significant advantage of this system consists therein that the whole of the rail guiding system is embedded flush in the floor and there are no protruding edges. Vehicles with small or hard wheels can drive over the rail without problems. Moreover, there are no steep vertical edges or deep crannies, in which dirt can collect.

The round rail can simply be exchanged in that, to begin with, the clamping profiles on either side of the rail can be loosened and removed, so that the rail is free. For the rail system which is known from DE 43 18 383 B4, the clamping profiles are locked into the carrier profiles and therefore not easily loosened. Furthermore, it is a problem to apply a defined clamping force on the rail, because this cannot be achieved practically by the locking connection. Even if loads, which act on the running surface from above, are introduced well into the carrier profile from above, the previous rail system does not offer sufficient resistance to forces for lifting the rail out of its anchorage. These forces arise because the wheel rolls away.

SUMMARY OF THE INVENTION

It is therefore the object of the present invention, to create a rail system of the type named above, the clamping profiles of which can be undone and also re-activated again relatively easily, but which, at the same time, offers an improved clamping action for holding the rail in its position in the carrier profile.

In accordance with the invention, this objective is accomplished by a rail system with the features of the claims.

The inventive rail system is distinguished by the fact that the open cross section of the carrier profile expands laterally downwards at least in an upper portion and forms an undercut cross sectional area. The side wall sections of the carrier profile, which form the lateral boundaries of this cross sectional area, are inclined inwards or curved concavely. On the other hand, the clamping profile comprises a cross-sectional part, which tapers in wedge-shape fashion downwards and is fitted into an appropriately shaped part of the gap, which is located within this undercut cross sectional area. This tapering part of the clamping profile is bounded in the direction of the rail by an inner contact surface and, in the direction of the side wall, by an outer contact surface, which lies against the corresponding upper section of the side wall.

Accordingly, the clamping profile, lying laterally against the rail, can slide at an angle or in an arc-shaped fashion from above into the gap; however, because of the undercutting of the opening cross-section of the carrier profile, it cannot be lifted vertically, together with the rail, out of the carrier profile. A corresponding force is fed onto the rail over the clamping profile two-dimensionally over an external contact surface into the side wall section, which is inclined or curved concavely. For this purpose, the outer contact surface is shaped to correspond to this side wall section and therefore has a corresponding inclination or curvature.

An exact fit of the wedge-shaped part of the clamping profile in the gap favors the introduction of levying forces, which act on the rail, into the carrier profile. The concept of "wedge-shaped" shall describe here, and in the following specification, a shape, the width of which decreases in one direction and the bounding surfaces of which converge. In this sense, the bounding surfaces may be either curved or flat. The bounding surfaces must not necessarily meet at the end of the wedge.

The undercutting of the free cross-sectional area of the carrier profile, together with the seat of the wedge-shaped part of the clamping profile in this part of the gap, brings about a self-retaining clamping action, which prevents the rail being lifted out. Dismantling is possible only if, to begin with, the clamping profile is raised at an angle or in the form of an arc from the gap and removed, subsequently making the exposed rail accessible.

Even though only one clamping profile, which is inserted in a lateral gap next to the rail, was mentioned above, it is understood that, in accordance with a broadened embodiment of such rail systems, the rail can be held on both sides by two clamping profiles of similar construction, as shown, also in the DE 4318 383 B4.

Because the upper part of the clamping profile is fitted into the gap, it is possible to transfer a defined clamping force to the rail by means of screws or rivets. For this purpose, the screws are passed from above through the clamping profile and screwed into the carrier profile, so that the clamping profile, together with the rail, is tightened to the carrier profile.

Preferably, the wedge-shaped tapering part forms an upper cross-sectional part of the clamping profile, and the clamping profile furthermore comprises a lower part, which has a lower, inner contact surface, which, at a level below the inner contact surface of the upper part, lies laterally against the rail. The additional inner contact surface at the lower part of the clamping profile ensures that the clamping profile cannot rotate out of the gap when the rail is raised.

In accordance with a preferred embodiment of the present invention, the upper inner contact surface as well as the outer contact surface of the tapering part of the clamping profile is curved arc-shaped in cross section.

Preferably, the upper inner contact surface and the outer contact surface are curved curvilinearly. Furthermore preferably, the upper inner contact surface and the outer contact surface of the part of the clamping profile, which tapers in wedge-shaped fashion, have different radii of curvature.

Furthermore preferably, the radius of curvature of the outer contact surface is larger than that of the upper inner contact surface.

In accordance with a further, preferred embodiment, the rail is constructed as a round rail with a circular cross section. With its underside, the round rail can be inserted in an also curvilinearly curved trough in the carrier profile. At its upper side, a free, curvilinearly shaped convex angularly region remains as a running surface for a roller.

In accordance with a further preferred embodiment of the present invention, the cross section of the outer contact surface of the clamping profile follows approximately the arc of a circle, the center of which is at a level above the center of the cross section of the round the rail. With that, especially the inner and outer contact surfaces of the clamping profile are defined by curved sections of circles, which are eccentric with respect to one another.

Preferably, the lower inner contact surface of the lower part of the clamping profile takes hold of the round rail laterally from below.

Furthermore preferably, the clamping profile is anchored in the carrier profile by screws or rivets, which extend from above through the clamping profile into the carrier profile. By these means, a defined clamping force can be exerted, as already described above. In particular, the screws are tightened with a defined torque for this purpose.

Preferably, the rail lies centrally in a mirror symmetrical carrier profile and is fixed between two identically constructed clamping profiles, which are inserted in the gaps on either side of the rail.

In accordance with a further preferred embodiment, the inventive rail system is characterized by a shear protection, which, at the same time, serves to connect two mutually adjoining carrier profiles and comprises a push plate, which lies vertically, upright between the ends of the carrier profiles, which are to be connected, and has a recess on its upper side, which corresponds essentially to the open cross section of the carrier profile, as well as parallel keys, which are inserted in the direction, in which the rail extends, into the openings in the push plate on either side of the recess and themselves have lateral outer recesses, in which the outer edges of the openings are fitted, so that the parallel keys are inserted securely in the openings, and lateral grooves in the carrier profiles, which extend in the same direction as the rail. The carrier profiles are pushed on either side between the parallel keys against the push plate, so that the inner sides of the parallel keys are taken up in the grooves.

The carrier profiles, which come up against the push plate from both sides, are aligned exactly with one another by the parallel keys, so that the grooves as a whole are aligned with one another for accommodating the parallel keys and, consequently, the carrier profiles. Accordingly, the carrier profiles can no longer be shifted laterally against one another, that is, transversely to the direction, in which the rail extends. Any longitudinal shifting of the parallel keys in the grooves is prevented by the secure arrangement in the openings. For removing the parallel keys from the openings, the carrier profiles must be pulled on both sides from the push plate, so that subsequently the parallel keys can be removed from the openings. Accordingly, the parallel keys can be removed only if the system is dismantled completely.

In accordance with a preferred embodiment of such a rail system, the underside of the rail has a transversely extending slot-shaped cutout for accommodating the upper edge of the push plate within the recess. With that, a longitudinal displacement of the rail on the carrier profiles is also prevented.

Preferably, the lateral and lower edges of the push plate protrude beyond the carrier profile. By these means, it becomes possible to anchor the edges of the push plate in the substrate in the surroundings of the carrier profile, for example, by encasing it in concrete.

BRIEF DESCRIPTION OF THE DRAWINGS

In the following, a preferred example of the invention is explained in greater detail by means of the drawing.

DETAILED DESCRIPTION

Figure 1:
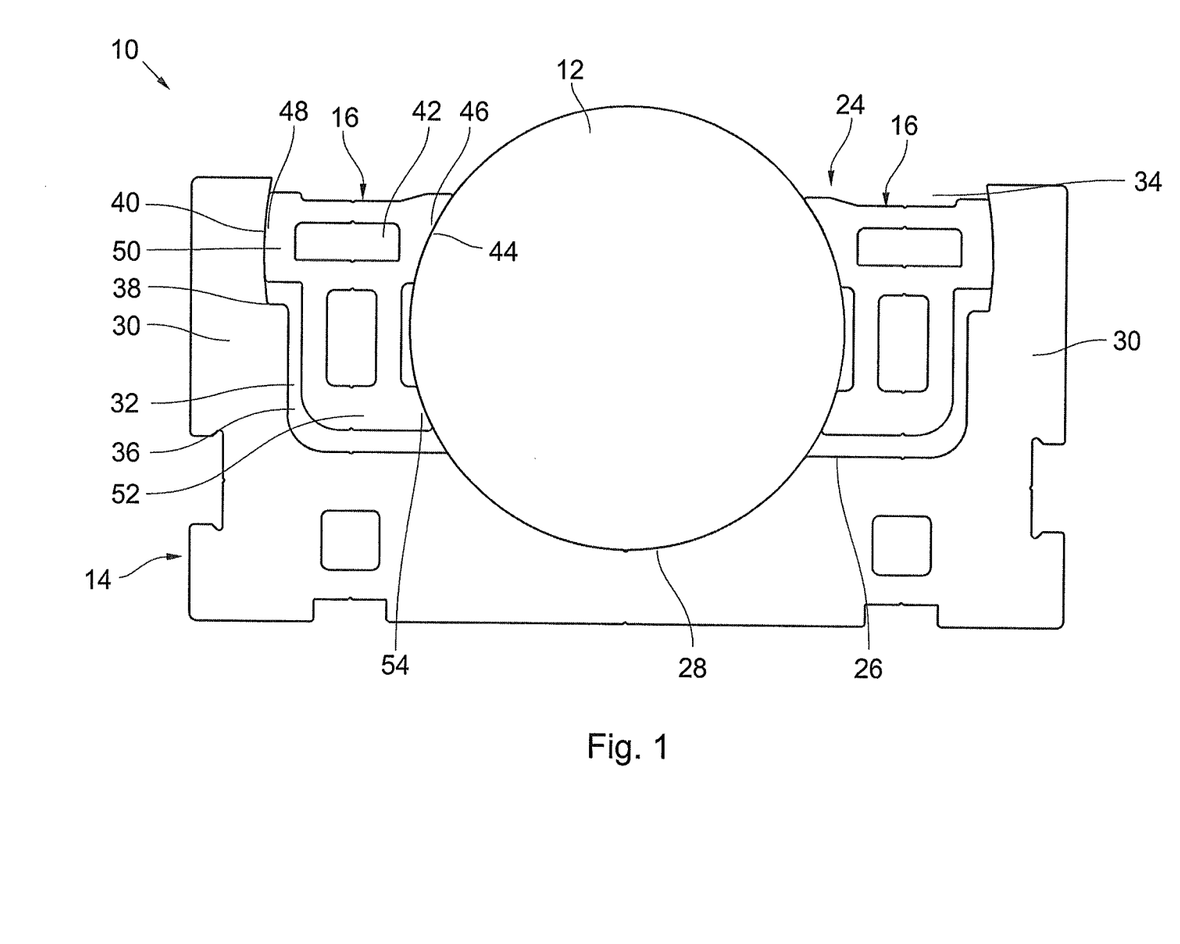
FIG. 1 shows a cross-section through a preferred embodiment of the inventive rail system.

The inventive rail system 10, shown in FIG. 1, comprises a rail 12, which is constructed as a solid round rail with a circular cross section and is mounted in a carrier profile 14. Usually, the carrier profile 14 is embedded flush in the substrate and is anchored therein. It has a cross sectional area or cross-section 24, which is open towards the top and in which the rail 12 lies. However, it does not fill the open cross section 24 of the carrier profile 14 completely. Instead, gaps 32 remain on either side of the rail 12, into which the clamping profile 16 is inserted and which somewhat overlaps laterally the upper side of the rail 12 and thus fixes the rail 12 securely in its position. Screws, which are passed perpendicularly from above through the clamping profile 16 and are not shown in FIG. 1, anchor the clamping profile 16 in the carrier profile 14. A free upper surface region of the rail 12, which serves as a running surface for a roller, remains between the upper sides of the clamping profiles 16.

The concepts of "top" and "bottom", used here and in the remaining specification, refer only to a conventional orientation of a floor rail system, which is also shown in the present example. However, this terminology is not intended to represent any limitation of the invention to such an orientation. Instead, it is also possible to use the rail system 10 shown, in a position, in which it is rotated about its longitudinal axis. In the present case, therefore, the open side of the carrier profile 14 is defined as the upper side only for the sake of simplicity.

The rail system 10 is mirror symmetrical with respect to its vertical plane, that is, identical clamping profiles 16 are disposed on either side of the rail 12. On its base, 26, the cross section 24 of the carrier profile, which is open towards the top, has a central, curvilinear recess 28, into which the underside of the rail 12 is inserted.

An upper part 34 of the open cross section 24 is separated from the lower part 36 thereof by a gradation 38 in the side walls 30. As seen from above, the upper part 34 is undercut, that is, spreads out from the upper side of the carrier profile 14 in the downward direction. Therefore, in the following, the upper part 34 shall be referred to as the undercut cross-sectional region 34 of the open cross section 24. It is bounded laterally by opposite upper sidewall sections 40 above the gradation 38, the inner sides of which are curved concavely. Below the gradation 38, the sidewalls 30 extend perpendicularly at their inner surfaces.

The upper part 42 of the gap 32, which forms a partial region of the undercut cross-sectional region 34 above the gradation 38 and lies between the concavely curved upper side wall section 40 and the rail 12, tapers downward. This tapering or narrowing is due to the fact that the gap 32 is bounded on the inside by the outer cylindrical surface of the rail 12. This has a smaller radius of curvature than the curvature of the side wall section 40, and its center of curvature is deeper. For this reason, the width of the cross section of the rail 12 in the undercut cross-sectional region 34 increases greatly from the top to the bottom. In this way, it is achieved that the gap 32, has its smallest width at the level of the gradation 38, although the undercut cross-sectional region 34 itself has its largest width above the gradation 38.

The upper part 42 of the gap 32 is bounded towards the inside by an upper bearing surface 44 of the rail 12. An inner, upper contact surface 46 of the clamping profile 16, which has the same curvature as the upper bearing surface 44 of the rail 12, lies against this upper bearing surface 44. On the other hand, the upper region on the outside of the clamping profile 16 has an outer contact surface 48, the shape of which corresponds to the curvature of the upper sidewall section 40 and clings thereto.

The inner contact surface 46 and the outer contact surface 48 form the boundary of an upper part 50 of the clamping profile 16, which, corresponding to the shape of the upper part 42 of the gap 32, tapers downwards and is fitted wedge-shaped into this part 42. At its remaining lower part 52, the clamping profile 16 has a lower, inner contact surface 54, which laterally lies in contact with the lower part of the rail 12 and the shape of which corresponds to the curvature of the outer casing of the rail 12. Overall, the clamping profile 16 is in contact with the rail 12 and the side wall 30 of the carrier profile 14 with three contact surfaces, namely with an upper inner contact surface 46 and a lower inner contact surface 54 at the rail 12 and with an upper outer contact surface 48 at the curved side wall 40.

As will be explained in greater detail in the following, this form of gap 32 and of the clamping profile 16, on the one hand, makes for an easy assembly and, on the other, for a clamping action, which prevents the rail 12 being lifted out unless the lateral clamping profiles 16 are dismantled previously.

Figure 2:
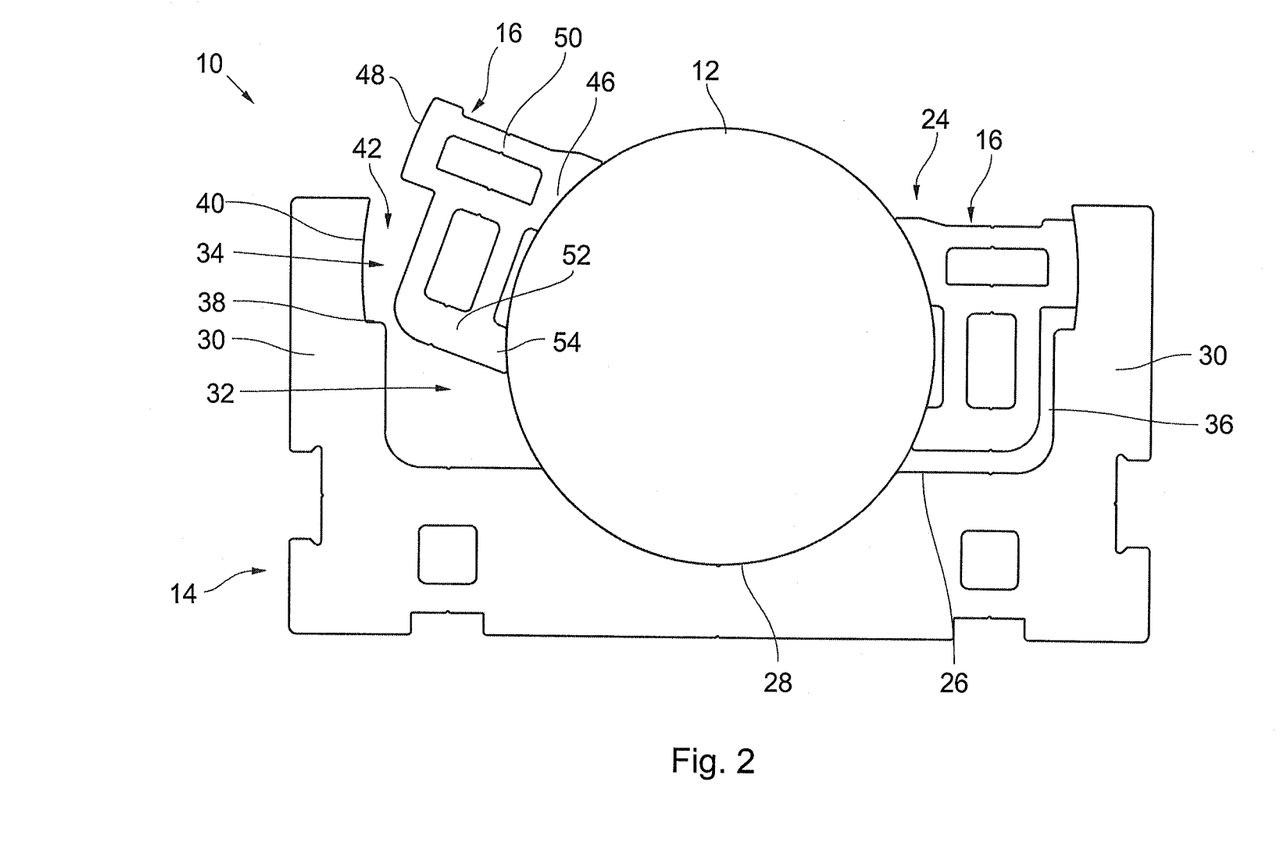
FIGS. 2 and 3 show further cross-sectional views of the present embodiment of the inventive rail system of FIG. 1, to explain the assembly operation.

FIG. 2 demonstrates how the clamping profile 16 is inserted into the gap 32. The right clamping profile 16 in FIG. 2 is already inserted, whereas the left clamping profile 16, on the outer casing of the rail 12 and following the curvature of the latter, slides downward into the gap 32. During this movement, both inner contact surfaces 46 and 54 of the clamping profile 16 are in contact with the rail 12. At the conclusion of this arc-shaped movement downward, the outer contact surface 48 is in contact with the upper side wall section 40 and terminates with this, so that the left clamping profile 16 also reaches its final installation position. This is shown in FIG. 3.

In this installation position, raising the rail 12 in the vertical direction upward would lead to a jamming of the clamping profile 16 in the undercut cross-sectional area 34. This is promoted, on the one hand, by the flush termination of the upper contact surfaces 46 and 48 on either side of the wedge-shaped upper part 50 of the clamping profile 16 with their respective contact surfaces, additionally, however, by the lateral stop of the inner contact surface 54 at the rail 12. This prevents any twisting of the clamping profile 16 when the rail 12 is raised.

Figure 3:
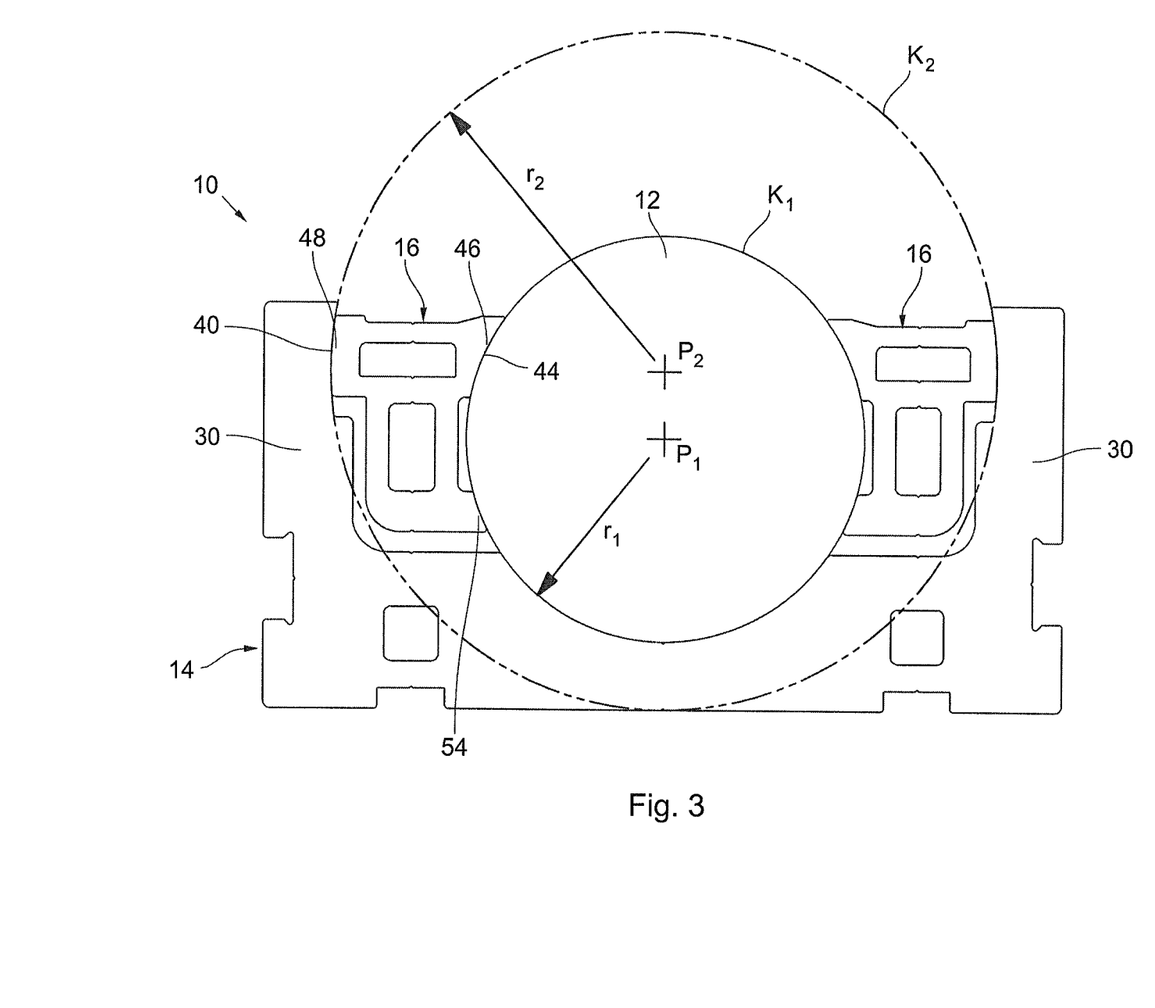

The two circles $K_1$ and $K_2$ in FIG. 3 are to illustrate the contours of the contact surfaces 46, 48 and 54 of the clamping profile 16. The inner circle $K_1$ describes the outer contour of the cross section of the rail 12. In the cross section, the inner contact surfaces 46 and 54 lie on arcs of this circle K. On the other hand, the cross section of the outer contact surface 48 follows the arc of a circle $K_2$ with a radius $r_2$, which is larger than the radius $r_1$ of the circle $K_1$. The center $P_2$ of this outer circle $K_2$ is above the center $P_1$ of the inner circle K. The circles $K_1$ and $K_2$ accordingly, are disposed eccentrically with offset centers $P_1$ and $P_2$. The different radii of curvature $r_1$ and $r_2$ of the upper inner contact surface 46 and the outer contact surface 48 here are responsible for the downwardly tapering cross-sectional shape of the upper part 50 of the clamping profile 16.

The formation of the contact surfaces 46, 48 and 54 as arcs not only makes easy insertion possible, but also a good transmission of force into the side walls 30 of the carrier profile 14 when a force acts to raise the rail 12.

Figure 4:
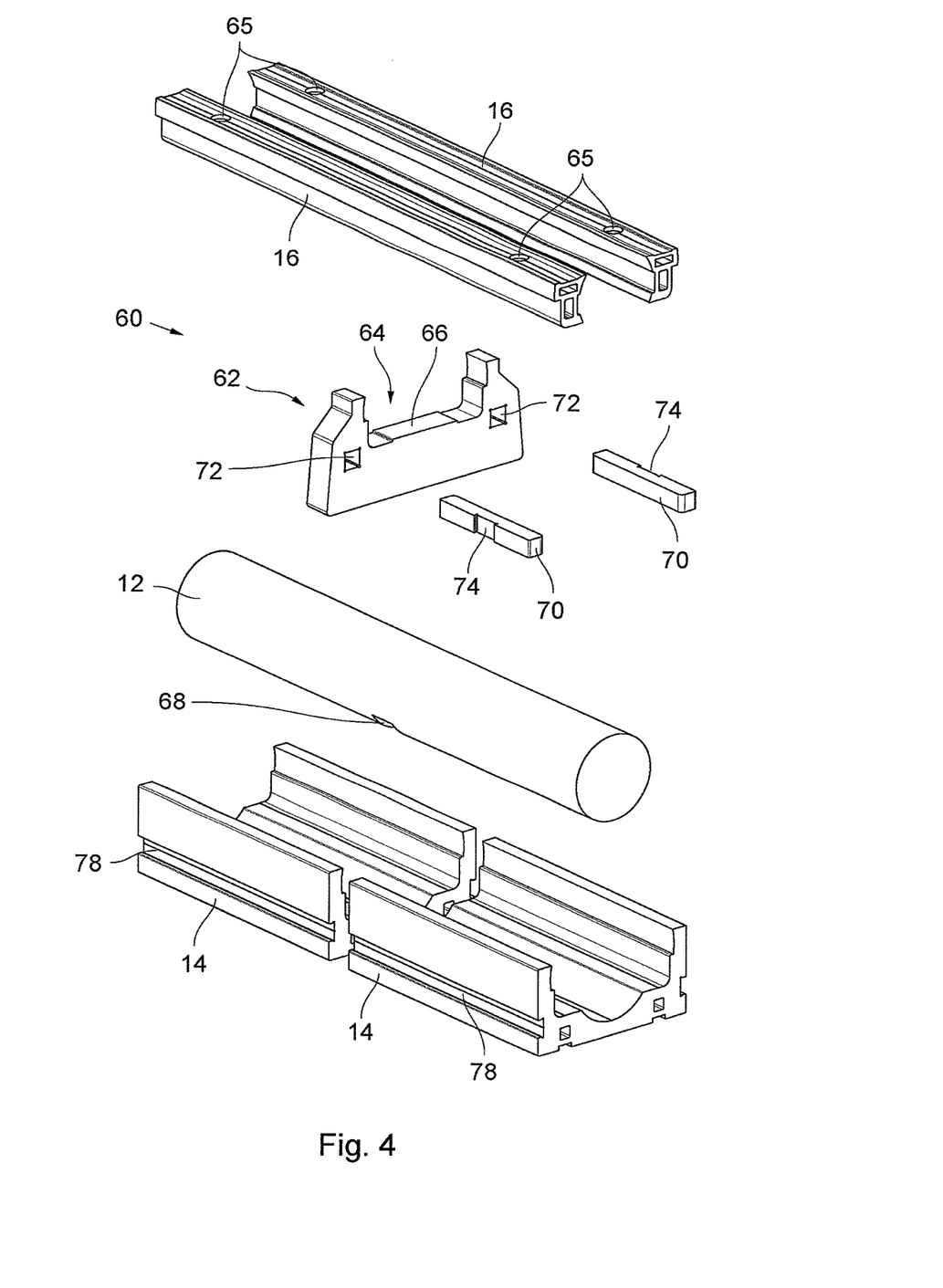
FIG. 4 shows a perspective, exploded representation of the present embodiment of the inventive rail system, which shows a shear protection in the form of a system for connecting two carrier profiles.

The exploded representation in FIG. 4 shows a shear protection 60 for connecting two mutually adjoining carrier profiles 14. This shear protection 60 is a component of a preferred embodiment of the inventive rail system 10. It comprises a push plate 62 of the lasered steel sheet, which is inserted vertically upright between the ends of the carrier profiles 14, which are to be connected. On its side, which is the upper side in the installation position, there is a recess 64 in the push plate 62, the dimensions of which essentially correspond to the open section 24 of the carrier profile 14. If the push plate 62 is vertical between the ends of the carrier profile 14 in FIG. 6, the cross section of the carrier profile 14 remains open also beyond the push plate 62 and the rail 12 can be inserted into the section 24. This installed position is shown in the cross section in FIG. 5.

Within the recess 64, a straight horizontal upper edge of the push plate 62 protrudes from below into the part of the open section 24 of the carrier profile 14, which forms the rounded trough 28 for accommodating the cross section of the round rail 12. The underside of the rail 12, on the other hand, has a slot 68, which extends transversely to the direction in which the rail 12 extends and accommodates the upper edge 66 of the push plate 62. Therefore, in the accommodated state in FIG. 5, the rail 12 cannot be shifted in the longitudinal direction. The positive engagement of the upper edge 66 in the slot-shaped recess 68 at the underside of the rail 12 prevents shifting.

Figure 5:
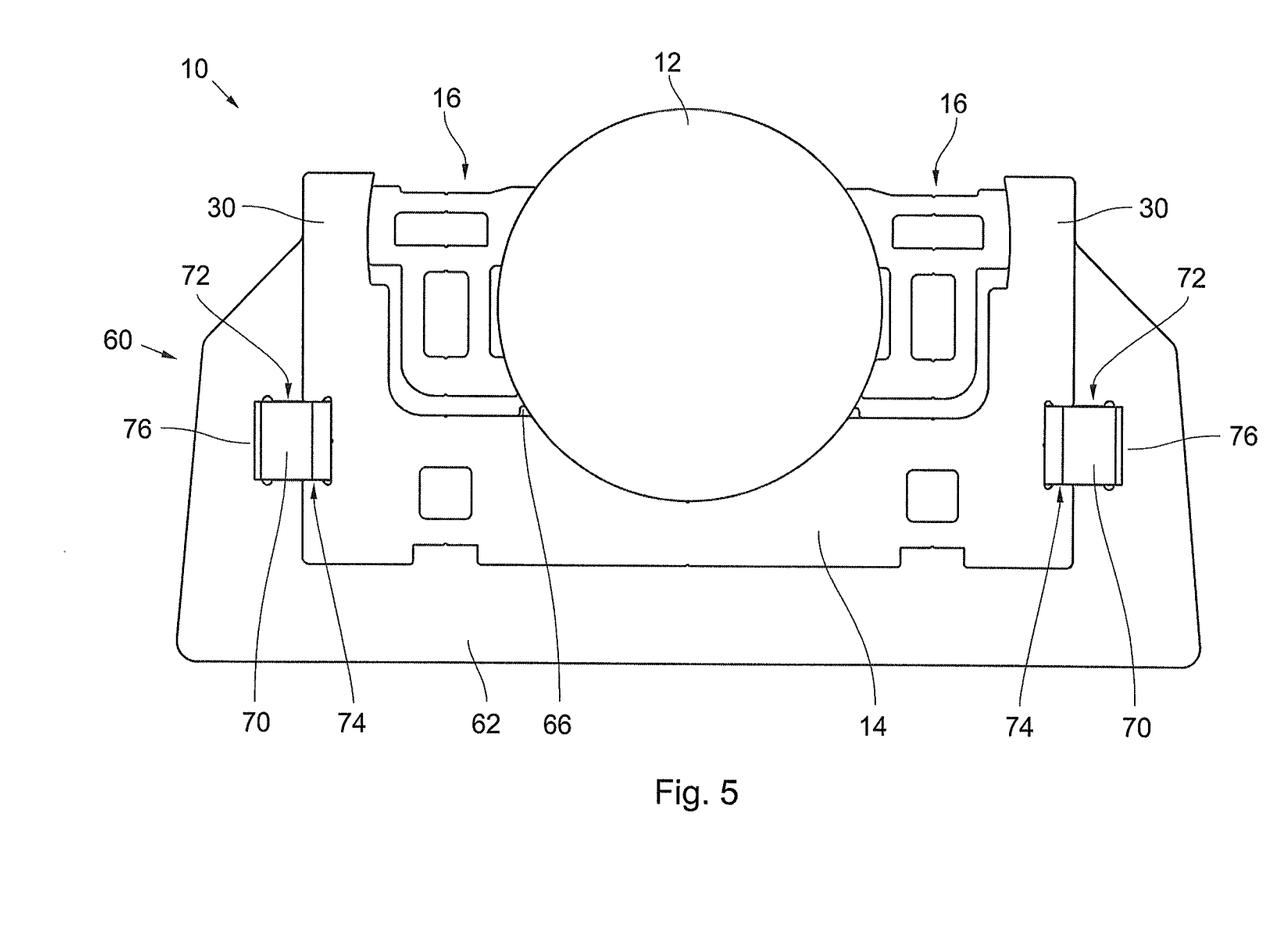
FIG. 5 shows a cross section through the present embodiment of the inventive rail system, including the shear protection

The push plate 62 is connected securely with the carrier profiles 14 attached thereto by parallel keys 70 on either side of the carrier profile 14. These parallel keys 70 have a rectangular cross-section and extend in the longitudinal direction of the rail 12 or of the carrier profiles 14. They are inserted in openings 72, which are present on either side of the recess 64 in the push plate 62. In the center of their length, the parallel keys 70 have lateral, outer cutouts 74 (FIG. 4), which are provided for accommodating the outer vertical edges 76 of the opening 72 (FIG. 5). That is, the length of the recesses 74 in the longitudinal direction of the parallel keys 70 corresponds to the thickness of the push plate 62. If the respective parallel key 70 is pushed into the opening 72, it can be pushed up to half its length laterally against the opening edge 76, so that this edge 76 lies in contact with the recess 74 and the parallel key 70 is held immovably in the opening 72.

The two parallel keys 70 are held in this immovable position in that the carrier profiles 14 are pushed from either side of the push plate 62 against them, and the inner sides of the parallel keys 70 are accommodated in grooves 78, which extend over the vertical outer sides of the carrier profiles 14 in the longitudinal direction of the latter. Then, in the installation position in FIG. 5, the parallel keys 70 lie naturally in the carrier profiles 14 and can no longer be pushed inward in the direction of the rail 12. The whole arrangement of the rail system 10 is completed by inserting the clamping profiles 16 and bolting them together.

Figure 6:
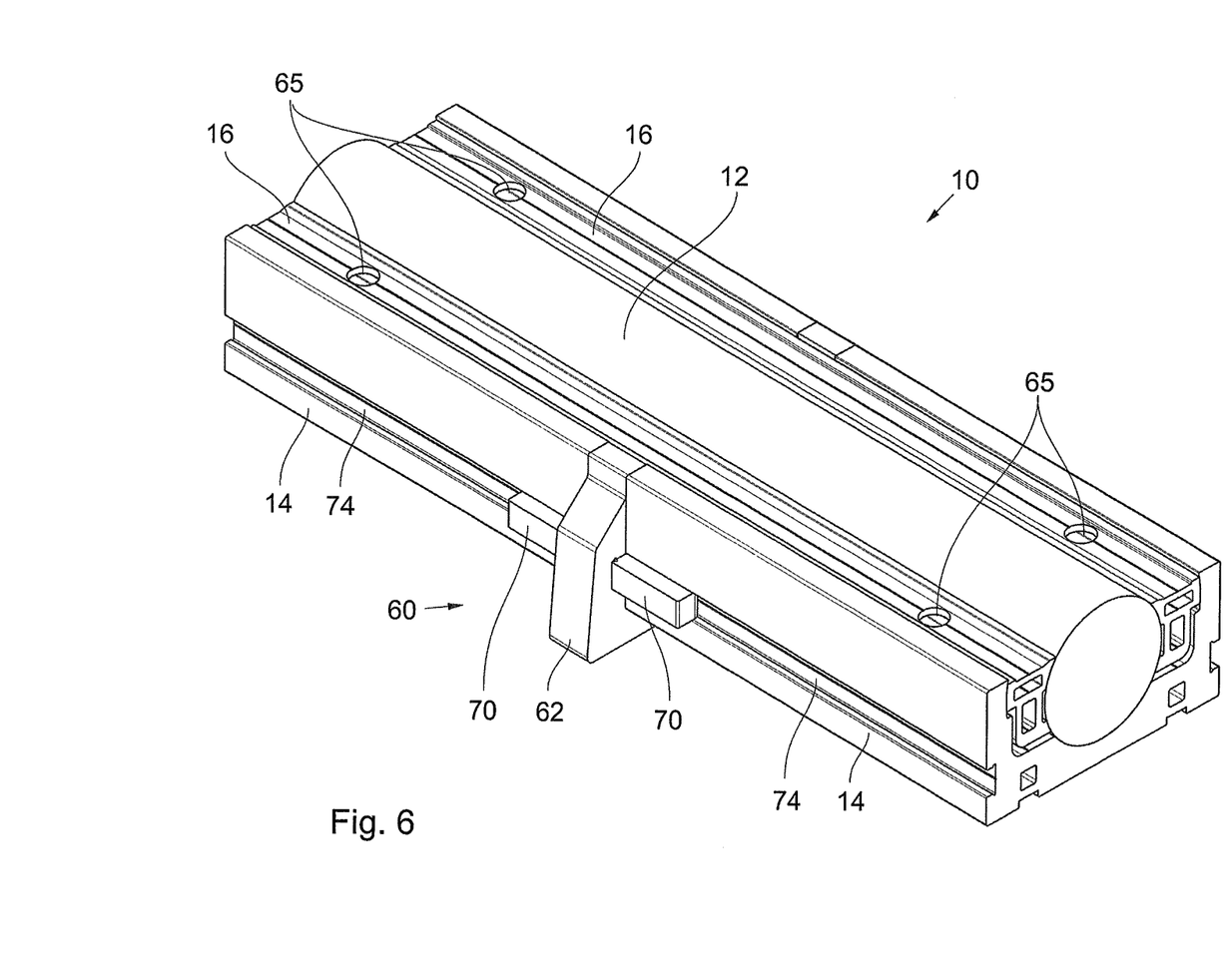
FIG. 6 shows a perspective view of the present rail systems, including the shear protection.

The complete rail system 10, including the shear protection 60, is shown in FIG. 6. The position of the lateral parallel key 70, which is inserted in the lateral grooves 78 in the carrier profiles 14 and extends through the opening 72 into the push plate 62, can be recognized clearly. The push plate 62 protrudes laterally and downward opposite the carrier profiles 14, so that, after the rail system 10 is fixed in the underground, there is no longer any possibility of shifting the rail system 10 as a whole in the longitudinal direction. FIG. 6 furthermore shows the screw holes 65 in the upper sides of the clamping profiles 16 for accommodating fastening screws.

The invention claimed is:

1. A rail system comprising:
a carrier profile which has a cross section that is open in an upward direction,
a rail which is inserted into the open cross section of the carrier profile in such a manner, that a gap remains at least between one side of the rail and a side wall of the carrier profile forming a boundary of the open cross section, and
at least one clamping profile which is inserted in the gap is in contact with an inner contact surface thereof laterally at a bearing surface of the rail and partially overlaps the rail,
at least one upper part of the open cross section of the carrier profile expanding laterally downward to an undercut cross-sectional region which is bounded by two opposite upper side wall sections of the carrier profile which are one of inclined inwardly and curved concavely, and
at least one part of the cross section of the at least one clamping profile tapers downward in a wedge fashion and is bounded in the direction of the rail by the inner contact surface and in the direction of the side wall of the carrier profile by an outer contact surface thereof which lies in contact with a said corresponding upper sidewall section, the at least one part being fitted into an appropriately shaped part of the gap within the undercut cross-sectional region of the carrier profile.

2. The rail system of claim 1, wherein:
the wedge-shaped tapering part forms an upper cross-sectional part of the at least one clamping profile and
the at least one clamping profile furthermore comprises a lower part, which has a lower inner contact surface which lies laterally in contact with the rail at a level below the inner contact surface of the upper part.

3. The rail system of claim 2, wherein the lower inner contact surface of the lower part of the at least one clamping profile laterally takes hold of the round rail from below.

4. The rail system of claim 1, wherein the upper inner contact surface as well as also the outer contact surface of the wedge-shaped tapering part of the at least one clamping profile are curved arc-shaped in cross section.

5. The rail system of claim 4, wherein the upper inner contact surface as well as the outer contact surface of the part of the at least one clamping profile, tapering in the form of a wedge, are curved curvilinearly.

6. The rail system of claim 4, wherein the upper inner contact surface and the outer contact surface of the wedge-shaped tapering part of the at least one clamping profile have different radii of curvature.

7. The rail system of claim 6, wherein the radius of curvature of the outer contact surface is larger than the radius of curvature of the upper inner contact surface.

8. The rail system of claim 1, wherein the rail is constructed as a round rail with a circular cross section.

9. The rail system of claim 8, wherein the cross section of the outer contact surface follows approximately the arc of a circle, the center of which is at a level above the center of the circle of the cross section of the round rail.

10. The rail system of claim 1, wherein the at least one clamping profile is anchored by one of screws and rivets in the carrier profile, which extend from a top through the at least one clamping profile into the carrier profile.

11. The rail system of claim 1, wherein the rail lies centrally in a mirror symmetrical carrier profile and is fixed between two identically constructed clamping profiles of said at least one clamping profile, each of which lies in a respective said gap on either side of the rail.

12. The rail system of claim 1, further comprising:
a shear protection as a connection between two mutually adjoining carrier profiles, said shear protection comprising a push plate which lies perpendicularly upright between ends of adjacent carrier profiles which are to be connected and, on an upper side thereof has a recess which corresponds essentially to the open cross section, and
parallel keys which are inserted into openings in the push plate in a direction in which the rail extends and on either side of the recess, the keys having lateral outer recesses in which outer edges of the openings are fitted, so that the parallel keys are inserted securely in the openings and lateral grooves in the carrier profiles, which extend in the direction in which the rail extends,
wherein the carrier profiles on either side are pushed between the parallel keys against the push plate in such a way, that inner sides of the parallel keys are taken up in the grooves.

13. The rail system of claim 12, wherein an underside of the rail has a slot-shaped recess which extends transversely and is slot-shaped for accommodating an upper edge of the push plate within the recess.

14. The rail system of claim 12, wherein lateral and lower edges of the push plate protrude beyond the carrier profile.

* * * * *